(12) United States Patent
Hieda et al.

(10) Patent No.: US 10,974,203 B2
(45) Date of Patent: Apr. 13, 2021

(54) CERAMIC MEMBRANE FILTER AND METHOD FOR PRODUCING THE SAME

(71) Applicant: NGK INSULATORS, LTD., Nagoya (JP)

(72) Inventors: Koji Hieda, Toki (JP); Muneyuki Iwabuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 112 days.

(21) Appl. No.: 16/142,474

(22) Filed: Sep. 26, 2018

(65) Prior Publication Data

US 2019/0022597 A1 Jan. 24, 2019

Related U.S. Application Data

(63) Continuation of application No. PCT/JP2017/010778, filed on Mar. 16, 2017.

(30) Foreign Application Priority Data

Mar. 30, 2016 (JP) ................... 2016-068395

(51) Int. Cl.
*B01D 69/02* (2006.01)
*B01D 63/06* (2006.01)
(Continued)

(52) U.S. Cl.
CPC .......... *B01D 69/02* (2013.01); *B01D 63/066* (2013.01); *B01D 67/0046* (2013.01);
(Continued)

(58) Field of Classification Search
CPC ........ B01D 69/02; B01D 69/10; B01D 69/12; B01D 71/02; B01D 71/025; B01D 67/0046; B01D 63/066; B01D 2325/02; B01D 2325/04; B01D 2325/24; C04B 38/00; C04B 41/009; C04B 41/85; C04B 41/89; C04B 41/90; C04B 41/526; C04B 40/00

See application file for complete search history.

(56) References Cited

U.S. PATENT DOCUMENTS

2007/0071962 A1 3/2007 Ehlen et al.
2010/0300960 A1 12/2010 Hishiki et al.
(Continued)

FOREIGN PATENT DOCUMENTS

JP H03-284328 A1 12/1991
JP 2002-128512 A1 5/2002
(Continued)

OTHER PUBLICATIONS

International Search Report and Written Opinion (Application No. PCT/JP2017/010778) dated May 30, 2017.
(Continued)

*Primary Examiner* — John Kim
(74) *Attorney, Agent, or Firm* — Burr & Brown, PLLC

(57) ABSTRACT

A ceramic membrane filter includes a porous substrate including cells through which a fluid flows, an intermediate membrane formed on the porous substrate, and a separation membrane formed on the intermediate membrane. In this ceramic membrane filter, the percentage of the number of cells having cracks with a size of 4 μm or less relative to the total number of cells is 9% or less.

17 Claims, 1 Drawing Sheet

(51) Int. Cl.
 *B01D 67/00* (2006.01)
 *B01D 69/12* (2006.01)
 *B01D 71/02* (2006.01)
 *C04B 40/00* (2006.01)
 *C04B 41/00* (2006.01)
 *C04B 41/52* (2006.01)
 *C04B 41/89* (2006.01)
 *C04B 41/85* (2006.01)
 *C04B 41/90* (2006.01)
 *B01D 69/10* (2006.01)
 *C04B 38/00* (2006.01)

(52) U.S. Cl.
 CPC ............ *B01D 69/10* (2013.01); *B01D 69/12* (2013.01); *B01D 71/02* (2013.01); *B01D 71/025* (2013.01); *C04B 38/00* (2013.01); *C04B 40/00* (2013.01); *C04B 41/009* (2013.01); *C04B 41/526* (2013.01); *C04B 41/85* (2013.01); *C04B 41/89* (2013.01); *C04B 41/90* (2013.01); *B01D 2325/02* (2013.01); *B01D 2325/04* (2013.01); *B01D 2325/24* (2013.01)

(56) References Cited

U.S. PATENT DOCUMENTS

2015/0008178 A1* 1/2015 Miyahara ............ B01D 63/066
 210/496
2015/0008180 A1* 1/2015 Uchikawa ............ B01D 63/061
 210/500.26
2016/0375405 A1* 12/2016 Miyahara ............ B01D 63/066
 210/500.21

FOREIGN PATENT DOCUMENTS

| JP | 2002-282629 | A1 | 10/2002 |
| JP | 2009-255035 | A1 | 11/2009 |
| WO | 2013/147272 | A1 | 10/2013 |
| WO | 2015/146354 | A1 | 10/2015 |

OTHER PUBLICATIONS

English translation of International Preliminary Report on Patentability (Chapter I) (Application No. PCT/JP2017/010778) dated Oct. 11, 2018.

* cited by examiner

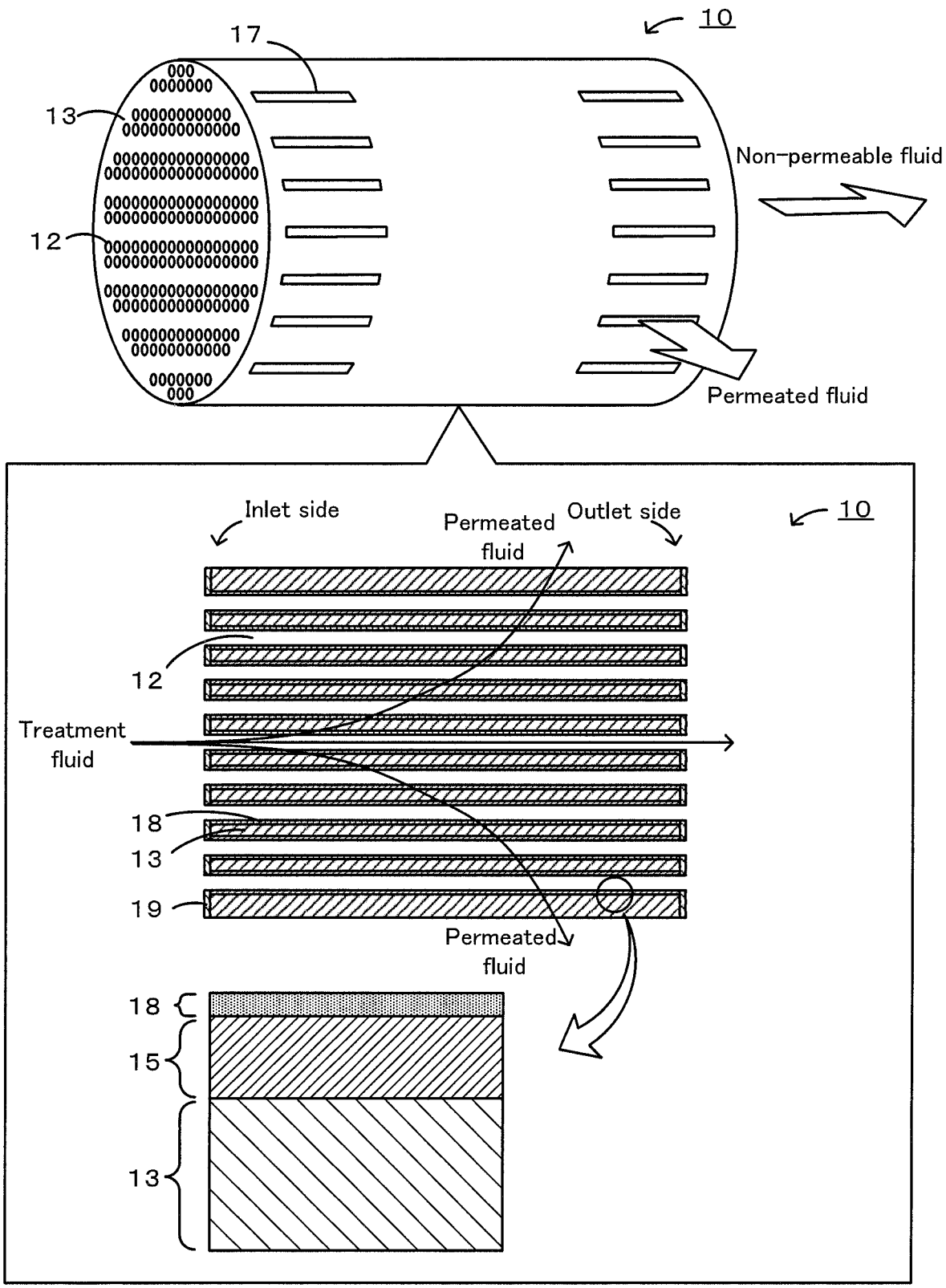

CERAMIC MEMBRANE FILTER AND METHOD FOR PRODUCING THE SAME

BACKGROUND OF THE INVENTION

1. Field of the Invention

The present disclosure disclosed in this specification relates to a ceramic membrane filter and a method for producing the ceramic membrane filter.

2. Description of the Related Art

There has been proposed a ceramic membrane filter including a porous substrate that is a microfiltration membrane (MF membrane), a titania ultrafiltration membrane (UF membrane) that is an ultrafiltration membrane having an average pore size of 2 to 20 nm and a thickness of 0.1 to 1.0 μm and that is formed on the porous substrate, and a ceramic membrane that is a ceramic porous membrane which partly permeates into pores of the titania UF membrane or pores of the titania UF membrane and the porous substrate and that is formed on the titania ultrafiltration membrane (e.g., refer to PTL 1). With this ceramic membrane filter, a ceramic filter including a ceramic porous membrane having less defects, a small and uniform thickness, and a high resolution can be provided.

CITATION LIST

Patent Literature

PTL 1: JP 2009-255035 A

SUMMARY OF THE INVENTION

However, in this ceramic membrane filter disclosed in PTL 1, a further increase in the thickness of the membrane formed on the substrate has not been considered. When the thickness of the membrane formed on the substrate is increased, defects such as tears formed during drying are easily generated. Thus, it has been desired that generation of such defects in the membrane is further suppressed.

In view of the foregoing, it is a main object of the present disclosure to provide a ceramic membrane filter in which generation of membrane defects can be further suppressed and a method for producing the ceramic membrane filter.

As a result of thorough studies conducted to achieve the above main object, the present inventors have found that when an intermediate membrane is formed on a substrate using a raw material slurry containing a resin having a relatively low molecular weight and a chain structure, generation of defects in the intermediate membrane can be further suppressed. Thus, they have completed the invention disclosed in this specification.

That is, a ceramic membrane filter disclosed in this specification includes a substrate including cells through which a fluid flows, an intermediate membrane formed on the substrate, and a separation membrane formed on the intermediate membrane, wherein a percentage of the number of cells having cracks with a size of 4 μm or less relative to the total number of cells is 9% or less.

A method for producing a ceramic membrane filter disclosed in this specification includes a formation step of forming a raw material layer for an intermediate membrane on a substrate using a raw material slurry prepared by mixing an organic binder, a ceramic raw material, and a solvent, the organic binder containing a dry crack inhibitor that is a resin having a chain structure and a molecular weight of 1000 or less, a deflocculant, and a polysaccharide compound, wherein in the formation step, the raw material layer is formed so as to have an average thickness of 150 μm or more and 480 μm or less by adding the dry crack inhibitor in an amount of 0.20 parts by mass or more and 0.95 parts by mass or less relative to 100 parts by mass of the ceramic raw material, adding the deflocculant in an amount of 0.15 parts by mass or more and 0.25 parts by mass or less relative to 100 parts by mass of the ceramic raw material, and adding the polysaccharide compound in an amount of 0.95 parts by mass or less relative to 100 parts by mass of the ceramic raw material to prepare the raw material slurry.

Advantageous Effects of Invention

In the ceramic membrane filter and the method for producing the ceramic membrane filter disclosed in this specification, generation of membrane defects in the intermediate membrane formed on the substrate can be further suppressed. The reason for this is believed to be as follows. For example, the dry crack inhibitor in the organic binder contained in the raw material slurry has a relatively low molecular weight of 1000 or less, which can further suppress an increase in the viscosity of the raw material slurry. Furthermore, in such a raw material slurry, it is believed that, for example, tearing during drying can be suppressed by the organic binder. Thus, the thickness of the intermediate membrane can be increased to, for example, 100 μm or more.

BRIEF DESCRIPTION OF THE DRAWINGS

FIG. 1 schematically illustrates a structure of a ceramic membrane filter 10.

DETAILED DESCRIPTION OF THE INVENTION

An embodiment according to the present disclosure will be described with reference to the attached drawing. FIG. 1 schematically illustrates a structure of a ceramic membrane filter 10 according to an embodiment of the present disclosure. The ceramic membrane filter 10 includes a porous substrate 13, an intermediate membrane 15 formed on the porous substrate 13, a separation membrane 18 formed on the intermediate membrane 15. Slits 17 are formed on the outer peripheral surface of the ceramic membrane filter 10, and sealing members 19 are formed on both end surfaces of the ceramic membrane filter 10. This ceramic membrane filter 10 is a filter for separating a treatment fluid containing a separation target.

In the ceramic membrane filter 10, the percentage of the number of cells having cracks with a size of 4 μm or less relative to the total number of cells is 9% or less. That is, there are no cracks with a size of more than 4 μm and the number of defects in the intermediate membrane 15 and the separation membrane 18 is extremely small. This ceramic membrane filter 10 may have an initial bubbling pressure in water of 0.08 MPa or more and the percentage of the number of bubbling cells relative to the total number of cells may be 9% or less. The phrase "the initial bubbling pressure in water is 0.08 MPa or more and the percentage of the number of bubbling cells relative to the total number of cells is 9% or less" corresponds to "there are no cracks with a size of more than 4 μm and the percentage of the number of cells having cracks with a size of 4 µm or less relative to the total number of cells is 9% or less". The cracks herein are cracks through which a fluid leaks out and which have a size of 1.0 µm or more. The bubbling pressure in water is a pressure (MPa) at which a filter is inserted into water at normal temperature (20° C.) and normal pressure (atmospheric pressure) and air is gradually pressurized from the side surface of the filter (slits 17), thereby causing bubbling from the outlet side (or the inlet side). Herein, the number of bubbling cells is measured to determine the percentage of the number of bubbling cells relative to the total number of cells. The bubbling pressure is preferably 0.15 MPa or more. The percentage of the number of bubbling cells may be 2.0% or less, which is preferred because the number of membrane defects is further decreased. If the percentage of the number of bubbling cells exceeds 3%, for example, the sterilization performance falls below 99.99% in a sterilization test conforming to JIS-K3835.

The ceramic membrane filter 10 can be used for, for example, gas separation and water separation. The ceramic membrane filter 10 may include, for example, a zeolite membrane as the separation membrane 18. The separation membrane 18 may be a membrane used as an MF membrane for sterilization. In particular, in the ceramic membrane filter 10 having a large membrane area, a zeolite membrane having less defects and containing small raw material particles can be formed. Furthermore, a filter with less membrane defects for complete sterilization can be provided.

In the porous substrate 13, a plurality of cells 12 serving as flow paths through which a fluid of the separation target flows are formed. In the ceramic membrane filter 10, a fluid having a molecular size capable of permeating the separation membrane 18, which is a part of the treatment fluid that enters the cells 12 from the inlet side, permeates the separation membrane 18, the intermediate membrane 15, and the porous substrate 13 and is released as a permeated fluid through the slits 17 from the side surface of the ceramic membrane filter 10. On the other hand, a non-permeable fluid that cannot permeate the separation membrane 18 flows along the flow paths of the cells 12 and is released from the outlet side of the cells 12. The porous substrate 13 may have a monolithic structure including a plurality of cells 12 or a tubular structure including a single cell. The outer shape is not particularly limited, but can be, for example, a cylinder, an elliptic cylinder, a quadrangular prism, or a hexagonal prism. Alternatively, the porous substrate 13 may have a tubular shape with a polygonal section.

The porous substrate 13 may have an average pore size of, for example, about 0.1 µm to about several hundred micrometers. The porous substrate 13 may have a porosity of 20 vol % or more and 70 vol % or less. The porous substrate 13 is mainly made of at least one ceramic of, for example, aluminum oxide (e.g., α-alumina, γ-alumina, and anodized alumina), titanium oxide (titania), silicon oxide (silica), zirconia, cordierite, and mullite. Such a porous substrate 13 has, for example, high thermal resistance, high chemical resistance, and high impact resistance. Among them, alumina is preferred in terms of production and availability of a substrate. The porous substrate 13 is preferably obtained by compacting and sintering alumina particles having an average particle size of 0.001 to 30 µm and serving as a raw material. The porous substrate 13 may have a single-layer structure or a multilayer structure. The porous substrate 13 may include, for example, a fine grain portion having a surface on which the intermediate membrane 15 is formed and a coarse grain portion having a surface on which the fine grain portion is formed. The porous substrate 13 may be a member having a larger pore size than the intermediate membrane 15 or a member having a higher porosity than the intermediate membrane 15. The porous substrate 13 may be a member obtained by, for example, extrusion molding.

The intermediate membrane 15 is a membrane that functions as a base layer for the separation membrane 18. The intermediate membrane 15 may be, for example, a supporting layer having a thickness of 100 µM or more and having a single-layer structure, but not a multilayer structure. The intermediate membrane 15 preferably has a single-layer (single-piece) structure because the number of interfaces is smaller than that in a multilayer structure and thus defects are not easily formed. The intermediate membrane 15 may have an average thickness of 120 µm or more and 450 µm or less. If the intermediate membrane 15 has a large thickness and less defects, the activity of defects in the separation membrane 18 can be further suppressed. The intermediate membrane 15 preferably has a maximum thickness difference of 50 µm or less, which is a maximum difference in thickness between center cells and outermost peripheral cells, more preferably 20 µm or less, further preferably 10 µm or less. The thickness of the intermediate membrane 15 is determined by cutting a filter in a direction in which cells are formed, performing observation with an electron microscope (SEM, STEM, or TEM), and measuring, at freely selected 24 positions, the thickness of intermediate membranes at center cells and at outermost peripheral cells on the upper and lower sides of the center cells. The thickness difference of the intermediate membrane 15 is a maximum thickness difference between center cells and outermost peripheral cells. The average thickness of the intermediate membrane 15 is an average of all measured thicknesses. The intermediate membrane 15 preferably has an average pore size of 0.1 µm or more and 0.6 µm or less.

The intermediate membrane 15 is mainly made of at least one ceramic of, for example, alumina, titania, silica, cordierite, zirconia, and mullite. Such an intermediate membrane 15 has, for example, high thermal resistance, high chemical resistance, and high impact resistance. Among them, alumina is preferred in terms of production and availability of the intermediate membrane 15. The intermediate membrane 15 may contain, in addition to the main material, at least one sintering agent of 5 mass % or more and 20 mass % or less of clay and 1 mass % or more and 35 mass % or less of titanium oxide. If the intermediate membrane 15 contains a sintering agent, the mechanical strength can be further increased.

The separation membrane 18 is a membrane that is formed on the intermediate membrane 15 and that causes selective permeation of a separation target in the treatment fluid. The separation membrane 18 may have an average thickness of, for example, 5 µm or more and 20 µm or less. When the thickness is 5 µm or more, the strength of the membrane can be further increased. When the thickness is 20 µm or less, a high permeation rate of the separation target can be achieved. The separation membrane 18 preferably has a maximum thickness difference of 5 µm or less, which is a maximum difference in thickness between center cells and outermost peripheral cells, more preferably 4 µm or less, further preferably 3 µm or less. The thickness of the separation membrane 18 is determined by cutting a filter in a direction in which cells are formed, performing observation with an electron microscope (SEM, STEM, or TEM), and measuring, at freely selected 24 positions, the thickness of intermediate membranes at center cells and at outermost peripheral cells on the upper and lower sides of the center cells. The thickness difference of the separation membrane 18 is a maximum thickness difference between center cells and outermost peripheral cells. The average thickness of the separation membrane 18 is an average of all measured thicknesses. The separation membrane 18 preferably has an average pore size of 0.05 µm or more and 0.5 µm or less.

The separation membrane 18 is mainly made of at least one ceramic of, for example, alumina, titania, silica, cordierite, zirconia, and mullite. Such a separation membrane 18 has high thermal resistance, high chemical resistance, and high impact resistance. Among them, alumina is preferred in terms of production and availability of the separation membrane 18. Alternatively, the separation membrane 18 may be a zeolite membrane containing zeolite. Examples of the zeolite include LTA (Type A), MFI (ZSM-5, silicalite), MOR (mordenite), AFI (SSZ-24), FER (ferrierite), FAU (Type X, Type T), and DDR (deca-dodecasil-3R).

The sealing member 19 is a sealing member through which a fluid does not permeate and which is disposed so as to cover the end surfaces of the porous substrate 13. The sealing member 19 may be formed of a glass containing an alkali component. The sealing member 19 prevents a treatment fluid from entering the substrate from the end surfaces of the substrate.

Next, a method for producing the ceramic membrane filter 10 will be described. The method for producing the ceramic membrane filter 10 may include, for example, a substrate production step of producing a substrate, an intermediate membrane formation step of forming an intermediate membrane on the substrate, and a separation membrane formation step of forming a separation membrane on the intermediate membrane. The substrate production step may be omitted by providing a substrate. The membrane formation is performed until the intermediate membrane and the separation membrane formation step may be omitted.

(Substrate Production Step)

In this step, a porous substrate is produced. Any row material mentioned in the ceramic membrane filter 10 may be used as a raw material for the substrate. The raw material for the substrate may be a mixture of a first main raw material X having a first particle size that is an average particle size and a second main raw material Y having a second particle size that is an average particle size and is smaller than the first particle size. The first particle size of the first main raw material X may be, for example, an average particle size of 50 µm or more and 200 µm or less. The second particle size of the second main raw material Y may be, for example, an average particle size of 20 µm or more and 100 µm or less. The mass ratio X/Y of the first main raw material X and the second main raw material Y may be in the range of 1/2 to 2/1. A sintering agent is preferably added to the raw material. Examples of the sintering agent include glass, clay, and titania. The amount of the sintering agent added is preferably in the range of 5 mass % or more and 20 mass % or less and more preferably in the range of 15 mass % or less relative to the total amount of the ceramic raw material. The substrate may have, for example, a filter-like shape illustrated in FIG. 1 and obtained by extrusion molding. The filter-like shape may be, for example, a shape having a diameter of 30 mm and a length of 500 mm with 37 cells, a shape having a diameter of 90 mm and a length of 500 mm with 360 cells, or a shape having a diameter of 180 mm and a length of 1000 mm with 2000 cells. This compact can be fired in an oxidizing atmosphere at 1000° C. or higher and 1400° C. or lower to obtain a fired body of a ceramic substrate. Herein, the "average particle size of raw material particles" is measured with a laser particle size distribution analyzer (LA-920 manufactured by HORIBA, Ltd.).

(Intermediate Membrane Formation Step)

In this step, a raw material layer for the intermediate membrane is formed on the substrate. In this step, a raw material slurry is used that is prepared by mixing an organic binder containing a dry crack inhibitor which is a resin having a chain structure and a molecular weight of 1000 or less, a ceramic raw material, and a solvent. The ceramic raw material is at least one ceramic of, for example, alumina, titania, silica, zirconia, cordierite, and mullite. Among them, for example, alumina and titania are preferred. The ceramic raw material preferably contains a main raw material and a sintering agent. The sintering agent is preferably clay and titania. The amount of clay added is preferably in the range of 5 mass % or more and 20 mass % or less relative to the total amount of the ceramic raw material. The amount of titania added is preferably in the range of 1 mass % or more and 35 mass % or less relative to the total amount of the ceramic raw material. The concentration of the raw material slurry may be, for example, in the range of 10 mass % or more and 20 mass % or less in terms of the solid content of the ceramic raw material.

The dry crack inhibitor contained in the organic binder is preferably a polyvinyl alcohol. The dry crack inhibitor more preferably has a molecular weight of 300 or more and 600 or less. In this step, the dry crack inhibitor is preferably added in an amount of 0.20 parts by mass or more and 0.95 parts by mass or less relative to 100 parts by mass of the ceramic raw material. When the amount of the dry crack inhibitor added is 0.20 parts by mass or more, generation of membrane defects due to tears by drying can be further suppressed. When the amount is 0.95 parts by mass or less, dehydration after formation of the membrane can be sufficiently performed. In this step, an organic binder further containing a deflocculant and a polysaccharide compound is preferably used. An example of the deflocculant is sodium polycarboxylate. In this step, the deflocculant is preferably added in an amount of 0.15 parts by mass or more and 0.25 parts by mass or less relative to 100 parts by mass of the ceramic raw material. When the amount of the deflocculant added is 0.15 parts by mass or more, the membrane raw material is sufficiently dispersed, which can suppress generation of membrane defects due to flocculated particles. When the amount is 0.25 parts by mass or less, occurrence of reflocculation can be further suppressed. As the amount of the deflocculant is gradually increased, the viscosity decreases. However, if the deflocculant is further added, the viscosity starts to increase or remains unchanged. The amount of the deflocculant added is preferably determined in advance from the slurry viscosity. An example of the polysaccharide compound is Welan gum. In this step, the polysaccharide compound is preferably added in an amount of 0.95 parts by mass or less relative to 100 parts by mass of the ceramic raw material. When the amount of the polysaccharide compound added is 0.95 parts by mass or less, dehydration can be performed, for example, in a vacuum and thus the membrane can be formed with more certainty. The amount of the polysaccharide compound added is preferably 0.2 parts by mass or more. When the amount of the polysaccharide compound added is 0.2 parts by mass or more, the thickness of the membrane can be made uniform, which can further suppress generation of membrane defects.

In this step, a raw material layer having an average thickness of 150 µM or more and 480 µm or less is preferably formed. The addition of the organic binder can further suppress generation of tears and the like. Therefore, a thick membrane having a thickness of, for example, 150 µm or more can be formed through a single membrane formation process. In this intermediate membrane, the addition of the organic binder is more effective to increase the thickness. However, the addition of the organic binder can also further suppress generation of defects even in a thin intermediate membrane having a thickness of, for example, 100 µM or less. In this formation of the raw material layer for the intermediate membrane, a ceramic raw material is preferably used that is prepared by mixing a first main raw material A having a first particle size which is an average particle size and a second main raw material B having a second particle size which is an average particle size and is smaller than the first particle size at a mass ratio A/B of 0.6 or more and 2 or less. The first particle size may be, for example, an average particle size of 1 µm or more and 5 µm or less. The second particle size may be, for example, an average particle size of 0.1 µM or more and 1 µM or less. When raw materials having different particle sizes are mixed, the intermediate membrane can be produced through a single membrane formation process and a single firing process. The raw material layer for the intermediate membrane can be formed on the substrate with, for example, a membrane formation apparatus using cross-flow filtration. In this method, the thickness of the intermediate membrane can be controlled by adjusting the flow rate of a filtrate.

(Separation Membrane Formation Step)

In this step, a separation membrane is formed on the intermediate membrane. The separation membrane may be formed by using, for example, a raw material slurry prepared by mixing an organic binder, a ceramic raw material, and a solvent. For example, the above-described alumina, titania, and zeolite can be used as the ceramic raw material. The organic binder may contain a deflocculant, a polysaccharide compound, and a water-soluble acrylic resin. The above-described deflocculant and polysaccharide compound can be used. In the formation of the separation membrane, the amount of the deflocculant added is preferably 0.25 parts by mass or more and 0.95 parts by mass or less relative to 100 parts by mass of the ceramic raw material. The amount of the polysaccharide compound added is preferably 0.95 mass % or less relative to 100 parts by mass of the ceramic raw material and more preferably 0.2 mass % or more. The amount of the water-soluble acrylic resin added is preferably 0.5 mass % or more and 2.4 mass % or less. In these ranges, a separation membrane can be produced while generation of membrane defects is further suppressed. The concentration of the raw material slurry may be, for example, in the range of 5 mass % or more and 10 mass % or less in terms of the solid content of the ceramic raw material. In this step, a separation membrane having an average thickness of 5 µm or more and 20 µm or less is preferably formed. The raw material layer for the separation membrane can be formed on the intermediate membrane with, for example, a membrane formation apparatus using cross-flow filtration. In this method, the thickness of the separation membrane can be controlled by adjusting the flow rate of a filtrate.

The thus-obtained ceramic membrane filter preferably includes sealing members formed on end surfaces of the ceramic membrane filter. Each of the sealing members may be made of, for example, glass. The sealing member may be formed by a method in which a slurry prepared from a raw material is applied or a method in which a raw material is melted by heating and thermally sprayed onto end surfaces. Alternatively, a ceramic membrane filter can be produced by forming a raw material layer for the intermediate membrane and a raw material for the separation membrane and then firing the raw material layer and the raw material in an oxidizing atmosphere at 1000° C. or higher and 1200° C. or lower.

In the ceramic membrane filter according to this embodiment described above, generation of membrane defects in the intermediate membrane formed on the substrate can be further suppressed. Furthermore, since the separation membrane is formed on the intermediate membrane with less membrane defects, generation of membrane defects in the separation membrane can be further suppressed. The reason for this is believed to be as follows. For example, the dry crack inhibitor in the organic binder contained in the raw material slurry has a relatively low molecular weight of 1000 or less, which can further suppress an increase in the viscosity of the raw material slurry. Furthermore, in such a raw material slurry, for example, tearing during drying can be suppressed by the organic binder. Thus, the thickness of the intermediate membrane can be increased to, for example, 100 µm or more or 150 µm or more.

The present disclosure is not limited to the above-described embodiment. It is obvious that various embodiments can be made without departing from the technical scope of the present disclosure.

EXAMPLES

Hereafter, Experimental Examples in which ceramic membrane filters were specifically produced will be described. Experimental Examples 1 to 4, 8 to 11, 17 to 19, 21 to 24, 26 to 28, 30 to 39, and 41 to 49 correspond to Examples. Experimental Examples 5 to 7, 12 to 16, 20, 25, 29, 40, and 50 to 52 correspond to Comparative Example.

[Production of Ceramic Membrane Filter]
[Production of Substrate]

30 mass % of an alumina raw material having an average particle size of 100 µm, 60 mass % of an alumina raw material having an average particle size of 40 µm, and 10 mass % of a glass raw material having an average particle size of 5 µm were weighed. Five parts by mass of methyl cellulose, 1 part by mass of an oil lubricant, and 35 parts by mass of water were added to 100 parts by mass of the raw materials and kneaded. The resulting mixture was formed into a degassed clay intermediate compact having a diameter of 250 mm and a length of 1000 mm using a vacuum clay kneader. Then, the intermediate compact was subjected to extrusion molding using a hydraulic plunger molding machine having a tip to which mouthpieces were attached to produce a cylindrical substrate having a diameter of 180 mm and a length of 1000 mm with 2000 cells. For the purpose of uniformly forming a membrane, slits were formed in the substrate at intervals of five rows of cells in a radial direction to achieve uniform drainage during filtration membrane formation. The compact was fired in an oxidizing atmosphere at 1250° C. for 2 hours to obtain a substrate. The substrate had an average pore size of 10 µm and a porosity of 38 vol %. The average particle size of the raw material particles was measured with a laser diffraction particle size distribution analyzer (LA-920 manufactured by HORIBA, Ltd.). The pore size and porosity of the substrate were measured with a mercury porosimeter (Autopore III 9400 manufactured by Shimadzu Corporation).

[Production of Intermediate Membrane]

A raw material slurry for an intermediate membrane was prepared by combining a ceramic raw material and a particular organic binder. For the ceramic raw material, an alumina raw material A having an average particle size of 2 µm and an alumina raw material B having an average particle size of 0.5 μm were weighed at a mass ratio A/B of 1/1. Furthermore, 90 mass % of the alumina raw materials and 10 mass % of a clay serving as a sintering agent were mixed with each other to obtain a ceramic raw material. The organic binder contained a deflocculant, a polysaccharide compound, and a polyvinyl alcohol serving as a dry crack inhibitor. The deflocculant was sodium polycarboxylate (Aron A6114 manufactured by TOAGOSEI Co., Ltd.). The polysaccharide compound was Welan gum (Welan gum K1A96 manufactured by CP Kelco). The dry crack inhibitor was a polyvinyl alcohol (PVA, JL-05E manufactured by Japan VAM & POVAL Co., Ltd.) having a molecular weight of 500. The dry crack inhibitor was added in the form of an aqueous solution containing the dry crack inhibitor dissolved therein so as to have a solid content of 2%. The slurry concentration was adjusted to 10 to 20 mass % in terms of alumina solid content. The mixing was performed by adding water to the alumina raw materials and then adding the polysaccharide, the PVA, and the sodium polycarboxylate thereto. In the organic binder, 0.2 parts by mass of the deflocculant, 0.6 parts by mass of the polysaccharide compound, and 0.4 parts by mass of the PVA relative to 100 parts by mass of the ceramic raw material were added. The slurry was filtered through the substrate with a membrane formation apparatus using cross-flow filtration, and the amount of slurry drained was controlled so that a membrane having a thickness of 250 μm was formed in an area of the substrate where the membrane was to be formed. After the membrane was formed, the substrate was taken out of the apparatus and dried using a dryer. The dried substrate was fired in an oxidizing atmosphere at 1200° C. for 5 hours.

[Production of Separation Membrane]

A raw material slurry for a separation membrane was prepared by combining a ceramic raw material and a particular organic binder. The ceramic raw material was an alumina raw material having an average particle size of 0.3 μm. The organic binder contained a deflocculant, a polysaccharide compound, and a water-soluble acrylic resin (resin A). The deflocculant was sodium polycarboxylate (Aron A6114 manufactured by TOAGOSEI Co., Ltd.). The polysaccharide compound was Welan gum (Welan gum K1A96 manufactured by CP Kelco). The water-soluble acrylic resin was an acrylic special water-soluble resin (Aron AS-7503 manufactured by TOAGOSEI Co., Ltd.). The slurry concentration was adjusted to 5 to 10 mass % in terms of alumina solid content. The mixing was performed by adding water to the alumina raw material, adding the deflocculant thereto, and then adding the polysaccharide, the PVA, and the sodium polycarboxylate thereto. In Experimental Example 48, an organic binder not containing a deflocculant was added and then a deflocculant was added to prepare a slurry. The slurry was filtered through the substrate with a membrane formation apparatus using cross-flow filtration, and the amount of slurry drained was controlled so that a membrane having a thickness of 10 μm was formed in an area of the substrate where the membrane was to be formed. After the membrane was formed, the substrate was taken out of the apparatus and dried using a dryer.

[Formation of Glass on End Surface]

A mixture of 20 mass % of a glass powder having an average particle size of 5 μm and 80 mass % of a methyl cellulose solution prepared in advance at a solid content of 2 mass % was sprayed. Herein, a portion in which the glass was not to be formed was masked so that the glass was applied onto only both end surfaces and portions having a width of about 15 mm from both peripheral edges (portions to which O-rings were fitted). The glass was applied so as to have a thickness of 1 mm for smoothening the surface of the substrate.

[Firing]

After the glass was formed on the end surfaces, the substrate was fired in an oxidizing atmosphere at 950° C.

Experimental Examples 1 to 5

The mixing ratio of the raw materials for the intermediate membrane was investigated. In Experimental Examples 1 to 5, the mixing ratio A/B of the raw materials in the above steps was set to 2/1, 1/1, 0.6/1, 0.5/1, and 0.4/1.

Experimental Examples 6 to 12

The thickness of the intermediate membrane was investigated. In Experimental Examples 6 to 12, the thickness of the intermediate membrane in the above steps was set to 80 μm, 100 μm, 150 μm, 250 μm, 300 μm, 400 μm, and 500 μm.

Experimental Examples 13 to 28

The addition amount of the organic binder for the intermediate membrane was investigated. In Experimental Examples 13 to 28, the amounts of the deflocculant, polysaccharide compound, and PVA added in the above steps were set to those listed in Tables 1 and 2.

Experimental Examples 29 to 33

The sintering agent for the intermediate membrane was investigated. Titania (rutile) was used as a sintering agent. In Experimental Examples 29 to 33, the amount of the sintering agent added was set to 0.5 mass %, 1 mass %, 5 mass %, 10 mass %, and 35 mass % relative to the total amount of the main material and the sintering agent.

Experimental Example 34

The shape of the substrate was investigated. In Experimental Example 34, the shape of the substrate was changed to a shape having a diameter of 90 mm and a length of 1000 mm with three rows of slits equally formed in the end surfaces.

Experimental Example 35

The sealing member on the end surface was investigated. In the above steps, after the formation of the separation membrane, firing was performed at 1200° C. and then alumina was thermally sprayed on the end surfaces to seal the end surfaces. In the thermal spraying, alumina melted by being heated to 1000° C. was formed on both end surfaces of the fired ceramic membrane filter so as to have a thickness of 1 mm. The resulting filter was a filter in Experimental Example 35.

Experimental Examples 36 to 50

The addition amount of the organic binder for the separation membrane was investigated. In Experimental Examples 36 to 50, the amounts of the deflocculant, polysaccharide compound, and resin A added in the above steps were set to those listed in Table 3.

Experimental Examples 51 and 52

The molecular weight of the PVA contained in the organic binder used for the intermediate membrane was investigated. In Experimental Examples 51 and 52, the molecular weight of the PVA contained in the organic binder used for the intermediate membrane was set to 2400 and the amounts of the PVA added were set to 0.2 mass % and 0.4 mass %, respectively.

(Bubbling Evaluation in Water)

For the ceramic membrane filters in Experimental Examples 1 to 52 after formation of membranes, bubbling evaluation in water was performed. The filter in each of Experimental Examples was inserted into water at 20° C. at normal pressure (atmospheric pressure) and air was gradually pressurized from the side surface. The pressure (MPa) at which bubbling occurred from the outlet side and the number of bubbling cells were measured. In the bubbling evaluation in water, "the initial bubbling pressure in water is 0.08 MPa or more and the percentage of the number of bubbling cells relative to the total number of cells is 9% or less" corresponds to "there are no cracks with a size of more than 4 μm and the percentage of the number of cells having cracks with a size of 1 μm or more and 4 μm or less relative to the total number of cells is 9% or less". In this case, "A" is given. If the above conditions are not satisfied, that is, if there are cracks with a size of more than 4 μm or if there are no cracks with a size of more than 4 μm but the percentage of the number of cells having cracks with a size of 1 μm or more and 4 μm or less relative to the total number of cells is more than 9%, "B" is given.

(Average Pore Size of Intermediate Membrane and Separation Membrane)

The average pore sizes of the intermediate membrane and the separation membrane were determined by analyzing a SEM image. The section of the intermediate membrane was observed with a SEM and separated into pore regions and a material region of the intermediate membrane by performing image processing. The diameters of circles inscribed in the pore regions were determined, and the average of the diameters was defined as an average pore size. The same applies to the separation membrane.

(Measurement of Thickness Difference)

For the intermediate membrane and the separation membrane, the difference in thickness between center cells and outermost peripheral cells of the ceramic membrane filter was measured. The filter was cut in a direction in which cells were formed and the thicknesses of intermediate membranes and separation membranes were measured at center cells and at outermost peripheral cells on the upper and lower sides of the center cells. The thickness was measured at freely selected 24 positions of the cells. The difference in thickness between the center cells and the outermost peripheral cells was determined, and the maximum difference was defined as a thickness difference (μm). The average of all the measured thicknesses was defined as a thickness of the intermediate membrane or a thickness of the separation membrane.

When the ceramic membrane filter was produced, the appropriate amount of the organic binder added was determined. The amount of the deflocculant added to the raw material slurry containing the ceramic raw material was changed and the slurry viscosity was determined. The relationship between the addition amount and the viscosity of the raw material slurry was determined, and the appropriate addition amount was set in a range in which the viscosity was low. Furthermore, the addition amount was changed when the deflocculant was used alone, when the polysaccharide compound and the PVA were used in combination, and when the deflocculant and the PVA were used in combination, and the thickness difference was determined. In this measurement, the intermediate membrane or the separation membrane was formed using the raw material slurry while the substrate was made to stand vertically. The relationship between the addition amount and the thickness difference was determined. The appropriate addition amount was set in a range in which the thickness difference was low, that is, in a range in which the thickness distribution in a radial direction and the thickness distribution in a direction in which the cells were formed were uniform.

RESULTS AND CONSIDERATION

Tables 1 to 3 show the production conditions and test results in Experimental Examples 1 to 52. As shown in Table 1, from the viewpoint of the mixing ratio of main raw materials for the intermediate membrane in Experimental Examples 1 to 5, when the mass ratio A/B of the alumina raw material A having an average particle size of 2 μm and the alumina raw material B having an average particle size of 0.5 μm was in the range of 0.6 to 2, the percentage of the number of bubbling cells with an initial bubbling pressure in water of 0.1 MPa or more relative to the total number of cells was found to be as suitable as 2.5% or less. The preferred average pore size of the intermediate membrane was in the range of 0.1 to 0.6 μm. As shown in Experimental Examples 6 to 12, the thickness of the intermediate membrane was assumed to be preferably more than 80 μm and less than 500 μm, more preferably 120 to 480 μm. The preferred amount of the organic binder added was found to be as follows. As shown in Experimental Examples 13 to 28, the amount of the deflocculant added was preferably 0.15 mass % or more and 0.25 mass % or less relative to 100 mass % of the ceramic raw material. The amount of the polysaccharide compound added was preferably 0.95 mass % or less (more preferably 0.2 mass % or more). The amount of the PVA added was preferably 0.25 mass % or more and 0.95 mass % or less. When titania was used as a sintering agent, the amount of the sintering agent added was found to be preferably 1 mass % or more and 35 mass % or less relative to the total amount of the ceramic raw material as shown in Experimental Examples 29 to 33. When clay was used as a sintering agent, the amount of the sintering agent added was found to be preferably 5 mass % or more and 20 mass % or less relative to the total amount of the ceramic raw material from the additional study conducted on the relationship between the addition amount and the number of bubbling cells in water. As shown in Experimental Example 34, the same results were obtained even when the substrate was changed.

In the formation of the separation membrane, the preferred amount of the organic binder added was found to be as follows. As shown in Experimental Examples 36 to 50, the amount of the deflocculant added was preferably 0.20 mass % or more and 0.95 mass % or less relative to 100 mass % of the ceramic raw material. The amount of the polysaccharide compound added was preferably 0.95 mass % or less (more preferably 0.2 mass % or more). The amount of the water-soluble acrylic resin (resin A) added was preferably 0.5 mass % or more and 2.4 mass % or less. Furthermore, it was found that the same results were obtained regardless of whether the main material for the separation membrane was alumina or titania. As shown in Experimental Examples 51 and 52, when a PVA having a molecular weight of 2400 was used in the organic binder for the intermediate membrane, the viscosity was high and defects were generated in the intermediate membrane. In contrast, when a PVA having a molecular weight of 500 was used, generation of defects in the intermediate membrane was found to be suppressed.

TABLE 1

| | Intermediate Membrane | | | | | | | | Separation Membrane | |
|---|---|---|---|---|---|---|---|---|---|---|
| | Average Pore Size μm | Thickness μm | Mixing Ration of the Raw Materials/ Average Particle | | Organic Binder[1] | | | Thickness Difference[2] μm | Average Pore Size μm | Thickness μm |
| | | | 2 μm | 0.5 μm | Deflocculant parts by mass | Polysaccharide parts by mass | PVA parts by mass | | | |
| Experimental Example 1 | 0.15 | 250 | 2 | 1 | 0.2 | 0.6 | 0.4 | 10 | 0.1 | 10 |
| Experimental Example 2 | 0.2 | 250 | 1 | 1 | 0.2 | 0.6 | 0.4 | 10 | 0.1 | 10 |
| Experimental Example 3 | 0.5 | 250 | 0.6 | 1 | 0.2 | 0.6 | 0.4 | 10 | 0.1 | 10 |
| Experimental Example 4 | 0.7 | 250 | 0.5 | 1 | 0.2 | 0.6 | 0.4 | 10 | 0.1 | 10 |
| Experimental Example 5 | 1.0 | 250 | 0.4 | 1 | 0.2 | 0.6 | 0.4 | 10 | 0.1 | 10 |
| Experimental Example 6 | 0.2 | 80 | 1 | 1 | 0.2 | 0.6 | 0.4 | 8 | 0.1 | 10 |
| Experimental Example 7 | 0.2 | 100 | 1 | 1 | 0.2 | 0.6 | 0.4 | 8 | 0.1 | 10 |
| Experimental Example 8 | 0.2 | 150 | 1 | 1 | 0.2 | 0.6 | 0.4 | 9 | 0.1 | 10 |
| Experimental Example 9 | 0.2 | 250 | 1 | 1 | 0.2 | 0.6 | 0.4 | 10 | 0.1 | 10 |
| Experimental Example 10 | 0.2 | 300 | 1 | 1 | 0.2 | 0.6 | 0.4 | 10 | 0.1 | 10 |
| Experimental Example 11 | 0.2 | 400 | 1 | 1 | 0.2 | 0.6 | 0.4 | 12 | 0.1 | 10 |
| Experimental Example 12 | 0.2 | 500 | 1 | 1 | 0.2 | 0.6 | 0.4 | 25 | 0.1 | 10 |
| Experimental Example 13 | 0.2 | 250 | 1 | 1 | 0.1 | 0.6 | 0.4 | 10 | 0.1 | 10 |
| Experimental Example 14 | 0.2 | 250 | 1 | 1 | 0.3 | 0.6 | 0.4 | 10 | 0.1 | 10 |
| Experimental Example 15 | 0.2 | 250 | 1 | 1 | 0.2 | 0.6 | 0.2 | 10 | 0.1 | 10 |
| Experimental Example 16 | 0.2 | 250 | 1 | 1 | 0.2 | 0.8 | 0.2 | 10 | 0.1 | 10 |
| Experimental Example 17 | 0.2 | 250 | 1 | 1 | 0.2 | 0.7 | 0.3 | 10 | 0.1 | 10 |
| Experimental Example 18 | 0.2 | 250 | 1 | 1 | 0.2 | 0.4 | 0.6 | 10 | 0.1 | 10 |
| Experimental Example 19 | 0.2 | 250 | 1 | 1 | 0.2 | 0.2 | 0.8 | 10 | 0.1 | 10 |

| | Separation Membrane | | | | | Performance | | |
|---|---|---|---|---|---|---|---|---|
| | Organic Binder[1] | | | Thickness Difference[2] μm | Cracks[4] | Bubbling Pressure in Water MPa | Bubbling Cell | |
| | Deflocculant parts by mass | Polysaccharide parts by mass | Resin A[3] parts by mass | | | | Number Pieces | Rate % |
| Experimental Example 1 | 0.5 | 0 | 1.5 | 2 | A | 0.35 | 3 | 0.2% |
| Experimental Example 2 | 0.5 | 0 | 1.5 | 2 | A | 0.3 | 5 | 0.3% |
| Experimental Example 3 | 0.5 | 0 | 1.5 | 2 | A | 0.21 | 21 | 1.1% |
| Experimental Example 4 | 0.5 | 0 | 1.5 | 2 | A | 0.11 | 120 | 6.0% |
| Experimental Example 5 | 0.5 | 0 | 1.5 | 2 | B | 0.08 | 280 | 14.0% |
| Experimental Example 6 | 0.5 | 0 | 1.5 | 2 | B | 0.04 | 800 | 40.0% |
| Experimental Example 7 | 0.5 | 0 | 1.5 | 2 | B | 0.05 | 450 | 22.5% |
| Experimental Example 8 | 0.5 | 0 | 1.5 | 2 | A | 0.2 | 28 | 1.4% |
| Experimental Example 9 | 0.5 | 0 | 1.5 | 2 | A | 0.3 | 17 | 0.9% |
| Experimental Example 10 | 0.5 | 0 | 1.5 | 2 | A | 0.35 | 2 | 0.1% |

TABLE 1-continued

|   | | | | | | | | |
|---|---|---|---|---|---|---|---|---|
| Experimental Example 11 | 0.5 | 0 | 1.5 | 2 | A | 0.3 | 8 | 0.4% |
| Experimental Example 12 | 0.5 | 0 | 1.5 | 2 | B | 0.02 | 1150 | 57.5% |
| Experimental Example 13 | 0.5 | 0 | 1.5 | 2 | B | 0.04 | 790 | 39.5% |
| Experimental Example 14 | 0.5 | 0 | 1.5 | 2 | B | 0.06 | 820 | 41.0% |
| Experimental Example 15 | 0.5 | 0 | 1.5 | 2 | B | 0.12 | 210 | 10.5% |
| Experimental Example 16 | 0.5 | 0 | 1.5 | 2 | B | 0.1 | 194 | 9.7% |
| Experimental Example 17 | 0.5 | 0 | 1.5 | 2 | A | 0.17 | 32 | 1.6% |
| Experimental Example 18 | 0.5 | 0 | 1.5 | 2 | A | 0.19 | 29 | 1.5% |
| Experimental Example 19 | 0.5 | 0 | 1.5 | 2 | A | 0.2 | 22 | 1.1% |

[1] Addition amount relative to 100 mass % of the ceramic raw material
[2] Maximum difference in thickness between center cells and outermost peripheral cells on upper and lower sides of center cells
[3] Resin A: Water-soluble acrylic resin
[4] A: Cracks with a size of 4 μm or less relative to the total number of cells is 9% or less, B: Cracks with a size of 4 μm or less relative to the total number of cells is more than 9%

TABLE 2

| | Intermediate Membrane | | | | | | | Separation Membrane | |
|---|---|---|---|---|---|---|---|---|---|
| | | | | Organic Binder[1] | | | | | |
| | Average Pore Size μm | Thickness μm | Sintering Agent Material | Deflocculant parts mass % | Polysaccharide parts by mass | PVA parts by mass | Thickness Difference[2] μm | Average Pore Size μm | Thickness μm |
| Experimental Example 20 | 0.2 | 250 | Clay | 10 | 0.2 | 0 | 1 | 60 | 0.1 | 10 |
| Experimental Example 21 | 0.2 | 250 | Clay | 10 | 0.2 | 0.2 | 0.4 | 60 | 0.1 | 10 |
| Experimental Example 22 | 0.2 | 250 | Clay | 10 | 0.2 | 0.3 | 0.4 | 20 | 0.1 | 10 |
| Experimental Example 23 | 0.2 | 250 | Clay | 10 | 0.2 | 0.4 | 0.4 | 15 | 0.1 | 10 |
| Experimental Example 24 | 0.2 | 250 | Clay | 10 | 0.2 | 0.8 | 0.4 | 20 | 0.1 | 10 |
| Experimental Example 25 | 0.2 | 250 | Clay | 10 | 0.2 | 1 | 0.4 | cannot be formed | | |
| Experimental Example 26 | 0.2 | 250 | Clay | 10 | 0.2 | 0 | 0.3 | 15 | 0.1 | 10 |
| Experimental Example 27 | 0.2 | 250 | Clay | 10 | 0.2 | 0 | 0.6 | 15 | 0.1 | 10 |
| Experimental Example 28 | 0.2 | 250 | Clay | 10 | 0.2 | 0 | 0.8 | 20 | 0.1 | 10 |
| Experimental Example 29 | 0.2 | 250 | Titania | 0.5 | 0.2 | 0.6 | 0.4 | not be sintered | | |
| Experimental Example 30 | 0.2 | 250 | Titania | 1 | 0.2 | 0.6 | 0.4 | 10 | 0.1 | 10 |
| Experimental Example 31 | 0.2 | 250 | Titania | 5 | 0.2 | 0.6 | 0.4 | 10 | 0.1 | 10 |
| Experimental Example 32 | 0.2 | 250 | Titania | 10 | 0.2 | 0.6 | 0.4 | 10 | 0.1 | 10 |
| Experimental Example 33 | 0.2 | 250 | Titania | 35 | 0.2 | 0.6 | 0.4 | 10 | 0.1 | 10 |
| Experimental Example 34[4] | 0.2 | 250 | Clay | 10 | 0.2 | 0.6 | 0.4 | 10 | 0.1 | 10 |
| Experimental Example 35[5] | 0.2 | 250 | Clay | 10 | 0.2 | 0.6 | 0.4 | 10 | 0.1 | 10 |

TABLE 2-continued

|  | | Separation Membrane | | | | | | |
|---|---|---|---|---|---|---|---|---|
|  | | Organic Binder[1] | | | | Performance | | |
|  | | Defloc-culant | Polysac-charide | Resin A[3] | Thickness | | Bubbling Pressure | Bubbling Cell | |
|  | | parts by mass | parts by mass | parts by mass | Difference[2] μm | Cracks[6] — | in Water MPa | Number Pieces | Rate % |
| | Experimental Example 20 | 0.5 | 0 | 1.5 | 2 | B | 0.08 | 260 | 13.0% |
| | Experimental Example 21 | 0.5 | 0 | 1.5 | 2 | A | 0.11 | 94 | 4.7% |
| | Experimental Example 22 | 0.5 | 0 | 1.5 | 2 | A | 0.17 | 34 | 1.7% |
| | Experimental Example 23 | 0.5 | 0 | 1.5 | 2 | A | 0.21 | 27 | 1.4% |
| | Experimental Example 24 | 0.5 | 0 | 1.5 | 2 | A | 0.17 | 28 | 1.4% |
| | Experimental Example 25 | | | | | B | | | |
| | Experimental Example 26 | 0.5 | 0 | 1.5 | 2 | A | 0.17 | 25 | 1.3% |
| | Experimental Example 27 | 0.5 | 0 | 1.5 | 2 | A | 0.31 | 29 | 1.5% |
| | Experimental Example 28 | 0.5 | 0 | 1.5 | 2 | A | 0.26 | 31 | 1.6% |
| | Experimental Example 29 | | | | | B | | | |
| | Experimental Example 30 | 0.5 | 0 | 1.5 | 2 | A | 0.24 | 14 | 0.7% |
| | Experimental Example 31 | 0.5 | 0 | 1.5 | 2 | A | 0.22 | 12 | 0.6% |
| | Experimental Example 32 | 0.5 | 0 | 1.5 | 2 | A | 0.25 | 11 | 0.6% |
| | Experimental Example 33 | 0.5 | 0 | 1.5 | 2 | A | 0.27 | 10 | 0.5% |
| | Experimental Example 34[4] | 0.5 | 0 | 1.5 | 2 | A | 0.2 | 8 | 2.2% |
| | Experimental Example 35[5] | 0.5 | 0 | 1.5 | 2 | A | 0.25 | 9 | 0.5% |

[1] Addition amount relative to 100 mass % of the ceramic raw material
[2] Maximum difference in thickness between center cells and outermost peripheral cells on upper and lower sides of center cells
[3] Resin A: Water-soluble acrylic resin
[4] Substrate having a diameter of 90 mm and a length of 1000 mm with 360 cells
[5] The sealing member on the end surface is formed by thermal spraying
[6] A: Cracks with a size of 4 μm or less relative to the total number of cells is 9% or less, B: Cracks with a size of 4 μm or less relative to the total number of cells is more than 9%

TABLE 3

| | Intermediate Membrane | | | | | | | Separation Membrane | |
|---|---|---|---|---|---|---|---|---|---|
| | | | Organic Binder[1] | | | | | | |
| | Average Pore Size μm | Thickness μm | Defloc-culant parts by mass | Polysac-charide parts by mass | PVA Molecular Weight | PVA parts by mass | Thickness Difference[2] μm | Average Pore Size μm | Thickness μm |
| Experimental Example 36 | 0.2 | 250 | 0.2 | 0.6 | 500 | 0.4 | 10 | 0.1 | 10 |
| Experimental Example 37 | 0.2 | 250 | 0.2 | 0.6 | 500 | 0.4 | 10 | 0.1 | 10 |
| Experimental Example 38 | 0.2 | 250 | 0.2 | 0.6 | 500 | 0.4 | 10 | 0.1 | 10 |
| Experimental Example 39 | 0.2 | 250 | 0.2 | 0.6 | 500 | 0.4 | 10 | 0.1 | 10 |
| Experimental Example 40 | 0.2 | 250 | 0.2 | 0.6 | 500 | 0.4 | 10 | 0.1 | 10 |
| Experimental Example 41 | 0.2 | 250 | 0.2 | 0.6 | 500 | 0.4 | 10 | 0.1 | 10 |

TABLE 3-continued

| | | | | | | | | | |
|---|---|---|---|---|---|---|---|---|---|
| Experimental Example 42 | 0.2 | 250 | 0.2 | 0.6 | 500 | 0.4 | 10 | 0.1 | 10 |
| Experimental Example 43 | 0.2 | 250 | 0.2 | 0.6 | 500 | 0.4 | 10 | 0.1 | 10 |
| Experimental Example 44 | 0.2 | 250 | 0.2 | 0.6 | 500 | 0.4 | 10 | 0.1 | 10 |
| Experimental Example 45 | 0.2 | 250 | 0.2 | 0.6 | 500 | 0.4 | 10 | 0.1 | 10 |
| Experimental Example 46[4] | 0.2 | 250 | 0.2 | 0.6 | 500 | 0.4 | 10 | 0.1 | 10 |
| Experimental Example 47 | 0.2 | 250 | 0.2 | 0.6 | 500 | 0.4 | 10 | 0.1 | 10 |
| Experimental Example 48 | 0.2 | 250 | 0.2 | 0.6 | 500 | 0.4 | 10 | 0.1 | 10 |
| Experimental Example 49 | 0.2 | 250 | 0.2 | 0.6 | 500 | 0.4 | 10 | 0.1 | 10 |
| Experimental Example 50 | 0.2 | 250 | 0.2 | 0.6 | 500 | 0.4 | 10 | 0.1 | 10 |
| Experimental Example 51[5] | 0.2 | 250 | 0.2 | 0.6 | 2400 | 0.2 | 55 | 0.1 | 10 |
| Experimental Example 52[5] | 0.2 | 250 | 0.2 | 0.6 | 2400 | 0.4 | cannot be formed | | |

| | Separation Membrane | | | | | | | |
|---|---|---|---|---|---|---|---|---|
| | Organic Binder[1] | | | | Performance | | | |
| | Deflocculant | Polysaccharide | Resin A[3] | Thickness | Cracks[6] | Bubbling Pressure | Bubbling Cell | |
| | parts by mass | parts by mass | parts by mass | Difference[2] μm | — | in Water MPa | Number Pieces | Rate % |
| Experimental Example 36 | 0.2 | 0 | 1.5 | 4 | A | 0.1 | 104 | 5.2% |
| Experimental Example 37 | 0.3 | 0 | 1.5 | 3 | A | 0.18 | 20 | 1.0% |
| Experimental Example 38 | 0.7 | 0 | 1.5 | 3 | A | 0.18 | 35 | 1.8% |
| Experimental Example 39 | 1 | 0 | 1.5 | 4 | A | 0.08 | 110 | 5.5% |
| Experimental Example 40 | 1.5 | 0 | 1.5 | cannot be formed | B | | | |
| Experimental Example 41 | 0.5 | 0.2 | 0 | 4 | A | 0.09 | 120 | 6.0% |
| Experimental Example 42 | 0.5 | 0.4 | 0 | 3 | A | 0.18 | 32 | 1.6% |
| Experimental Example 43 | 0.5 | 0.6 | 0 | 2 | A | 0.25 | 15 | 0.8% |
| Experimental Example 44 | 0.5 | 0.8 | 0 | 3 | A | 0.18 | 32 | 1.6% |
| Experimental Example 45 | 0.5 | 1 | 0 | 4 | A | 0.08 | 150 | 7.5% |
| Experimental Example 46[4] | 0.5 | 0 | 1.5 | 2 | A | 0.37 | 0 | 0.0% |
| Experimental Example 47 | 0.5 | 0 | 0.5 | 4 | A | 0.1 | 110 | 5.5% |
| Experimental Example 48 | 0.5 | 0 | 1 | 3 | A | 0.18 | 34 | 1.7% |
| Experimental Example 49 | 0.5 | 0 | 2 | 3 | A | 0.17 | 28 | 1.4% |
| Experimental Example 50 | 0.5 | 0 | 2.5 | cannot be formed | B | | | |
| Experimental Example 51[5] | 0.5 | 0 | 1.5 | 2 | B | 0.06 | 250 | 12.5% |
| Experimental Example 52[5] | | | | | B | | | |

[1]Addition amount relative to 100 mass % of the ceramic raw material
[2]Maximum difference in thickness between center cells and outermost peripheral cells on upper and lower sides of center cells
[3]Resin A: Water-soluble acrylic resin
[4]Titania is used as a ceramic for the separation membrane. For other experimental examples, alumina is used
[5]Molecular weight of the PVA is set to 2400. For other experimental examples, molecular weight is set to 500
[6]A: Cracks with a size of 4 μm or less relative to the total number of cells is 9% or less, B: Cracks with a size of 4 μm or less relative to the total number of cells is more than 9%

The present disclosure is not limited to Examples described above. It is obvious that various embodiments can be made without departing from the technical scope of the present disclosure.

The present application claims priority from Japanese Patent Application No. 2016-68395, file on Mar. 30, 2016, the entire contents of which are incorporated herein by reference.

What is claimed is:

1. A ceramic membrane filter comprising:
   a substrate including cells through which a fluid flows;
   an intermediate membrane formed on the substrate; and
   a separation membrane formed on the intermediate membrane,
   wherein a percentage of the number of cells having cracks with a size of 4 μm or less relative to the total number of cells is 9% or less.

2. The ceramic membrane filter according to claim 1, wherein an initial bubbling pressure in water is 0.08 MPa or more and a percentage of the number of bubbling cells relative to the total number of cells is 9% or less.

3. The ceramic membrane filter according to claim 1, wherein the separation membrane has an average thickness of 5 μm or more and 20 μm or less.

4. The ceramic membrane filter according to claim 1, wherein the intermediate membrane has an average thickness of 120 μm or more and 450 μm or less.

5. The ceramic membrane filter according to claim 1, wherein the intermediate membrane has an average pore size of 0.1 μm or more and 0.6 μm or less.

6. The ceramic membrane filter according to claim 1, wherein the intermediate membrane contains aluminum oxide or titanium oxide as a main raw material and contains clay or titanium oxide as a sintering agent.

7. The ceramic membrane filter according to claim 1, wherein the intermediate membrane has an average thickness of 170 μm or more and 450 μm or less.

8. The ceramic membrane filter according to claim 7, wherein the intermediate membrane is a single layer.

9. The ceramic membrane filter according to claim 1, wherein the intermediate membrane is a single layer.

10. A method for producing a ceramic membrane filter, the method comprising:
    a formation step of forming a raw material layer for an intermediate membrane on a substrate using a raw material slurry prepared by mixing an organic binder, a ceramic raw material, and a solvent, the organic binder containing a dry crack inhibitor that is a resin having a chain structure and a molecular weight of 1000 or less, a deflocculant, and a polysaccharide compound,
    wherein in the formation step, the raw material layer is formed so as to have an average thickness of 150 μm or more and 480 μm or less by adding the dry crack inhibitor in an amount of 0.20 parts by mass or more and 0.95 parts by mass or less relative to 100 parts by mass of the ceramic raw material, adding the deflocculant in an amount of 0.15 parts by mass or more and 0.25 parts by mass or less relative to 100 parts by mass of the ceramic raw material, and adding the polysaccharide compound in an amount of 0.95 parts by mass or less relative to 100 parts by mass of the ceramic raw material to prepare the raw material slurry,
    wherein a separation membrane is formed on the intermediate membrane; and
    wherein the ceramic membrane filter has a percentage of the number of cells having cracks with a size of 4 μm or less relative to the total number of cells is 9% or less.

11. The method for producing a ceramic membrane filter according to claim 10, wherein in the formation step, the polysaccharide compound is added in an amount of 0.2 parts by mass or more and 0.95 parts by mass or less relative to 100 parts by mass of the ceramic raw material.

12. The method for producing a ceramic membrane filter according to claim 10, wherein in the formation step, a main raw material and a sintering agent are used as the ceramic raw material.

13. The method for producing a ceramic membrane filter according to claim 10, wherein in the formation step, at least one of clay and titanium oxide is used as the sintering agent.

14. The method for producing a ceramic membrane filter according to claim 10, wherein in the formation step, a main raw material and a sintering agent are used as the ceramic raw material, and titanium oxide is used as the sintering agent in an amount of 1 mass % or more and 35 mass % or less relative to the total amount of the ceramic raw material.

15. The method for producing a ceramic membrane filter according to claim 10, wherein in the formation step, polyvinyl alcohol is used as the dry crack inhibitor.

16. The method for producing a ceramic membrane filter according to claim 10, wherein in the formation step, the ceramic raw material contains aluminum oxide or titanium oxide as a main raw material.

17. The method for producing a ceramic membrane filter according to claim 10, wherein in the formation step, the ceramic raw material is prepared by mixing a first main raw material A having a first particle size that is an average particle size and a second main raw material B having a second particle size that is an average particle size and is smaller than the first particle size at a mass ratio A/B of 0.6 or more and 2 or less.

* * * * *